Dec. 7, 1965  J. T. FERRIS  3,221,593

BORESCOPE UTILIZING A STEPPED CONE REFLECTOR

Filed Sept. 25, 1961

INVENTOR.
JOHN T. FERRIS
BY Arthur L. Nelson
Frank C. Parker
ATTORNEYS

United States Patent Office 3,221,593
Patented Dec. 7, 1965

3,221,593
BORESCOPE UTILIZING A STEPPED
CONE REFLECTOR
John T. Ferris, Pittsford, N.Y., assignor to Bausch &
Lomb Incorporated, Rochester, N.Y., a corporation of
New York
Filed Sept. 25, 1961, Ser. No. 140,422
1 Claim. (Cl. 88—14)

This invention relates to a borescope and more particularly to an improved reflector and flexible means included in the borescope.

Periodical inspection for detection of flaws or points of failure in boiler tubes or other industrial piping require visual observation of internal surfaces of the cavities. To make a complete observation it is necessary that the instrument viewing the internal surface provide an uninterrupted field of view as the instrument is passed longitudinally within the bore. It is also desirable that the field covered be in focus even though a varying radial distance is present between the instrument and the internal surface of the bore. Accordingly this invention provides such an instrument for visual observation. The instrument devised provides an uninterrupted field of view for 360° about the inner periphery of the cavity in the member being observed and also provides an axial field of view in which no interruption is present in the field.

It is an object of this invention to provide a borescope having a conical reflector directing an uninterrupted field of view toward a point of observation.

It is another object of this invention to provide a conical reflector in an internal observation instrument which gives a full peripheral view of 360° regardless of the varying radial dimension between the observing instrument and the object.

It is a further object of this invention to provide a flexible borescope for observation of a complete field on the internal surface of a hollow member regardless of whether the instrument is inserted within an air or liquid filled cavity.

It is a further object to provide oblique lighting to increase shadow lengths of surface irregularities particularly on monochromatic surfaces to improve visible detail.

The objects of this invention are accomplished by providing a source of illumination placed in the forward end of a borescope. A disc is then inserted between the illuminating source and a conical reflector. The conical reflector is on a common axis with the source of light and extends with a conical portion rearwardly toward a lens means. The lens means receives an image from the conical reflector which is illuminated by the source of light. The lens means projects an image on a planar surface of a plurality of flexible fibers which operate as an image transmitting means to a point of visual observation. The instrument is flexible to permit operation in a cavity which may be nonlinear in shape. The reflector receives an image directly from the object as no lens system is intermediate the object and the reflector. The objective distance of the object from the reflector is therefore not critical. The instrument provides uninterrupted view for a full 360° of the inner periphery of the cavity in the member and also for a longitudinal distance within the cavity to provide a complete field of view of the inner periphery of the member as the borescope is inserted within the cavity.

Figure 1:
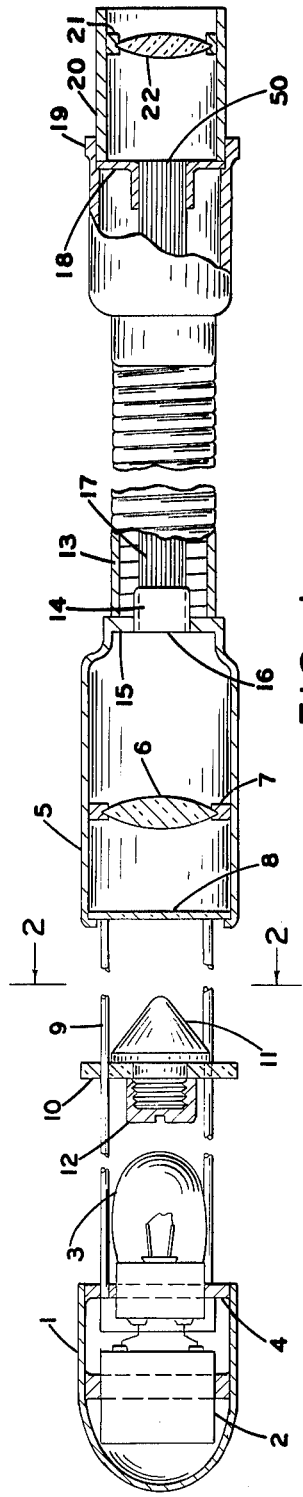
FIG. 1 is a cross section view of the borescope having a battery as an energizing means for the source of illumination and no transparent housing.

Referring to FIG. 1 a cross section of the borescope is illustrated. The forward end of the borescope includes a housing 1 which encloses a battery 2 which provides a source of energization for the bulb 3. And end plate 4 provides a supporting means for the bulb 3 and the battery 2. The bulb 3 is mounted concentrically on the end plate 4 and provides illumination in 360°.

The casing 5 encloses a lens 6 which is mounted on the lens support 7. The forward end of the casing 5 is connected to a cover plate 8 which is transparent to permit entrance of light and prevent a liquid from coming in contact with the lens. Liquid contacting the lens would change the focal length and make the device inoperative in a liquid. A plurality of rods 9 are fastened in the plate 8 and extend forwardly to the supporting plate 4 thereby supporting housing 1 in a coaxial position relative to the casing 5. Intermediate on the plurality of rods 9 is positioned the disc 10 which provides a supporting means for the conical reflector 11. The disc 10 as illustrated in FIG. 1 is constructed of a transparent material to provide a greater field of illumination and provide a more oblique lighting of the illuminated surface beyond the disc 10. A nut 12 fastens the conical reflector 11 to the disc 10.

The rearward end of the casing 5 receives a flexible conduit 13. A band 14 is fitted within a radial flange 15 of the flexible casing 5. The band 14 maintains a correlated position of the end surfaces of the plurality of fibers 17. The plurality of flexible fibers 17 extends longitudinally through the flexible conduit 13 and are received within the ring 18. The ring 18 has a radial planar flange which seats within the inner periphery of the sleeve 19. A sleeve 19 also encloses the tube 20 having a lens mount 21 supporting the lens 22. The lens 22 transmits the image to a point for visual observation.

Figure 2:
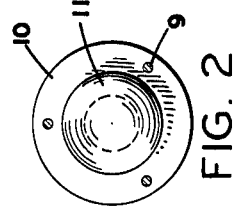
FIG. 2 is a cross section taken on line 2—2 of FIG. 1.

FIG. 2 is a cross section view taken on line 2—2 of FIG. 1. FIG. 2 shows the end view of the conical reflector 11 coaxially mounted relative to the disc 10. The plurality of rods 9 which support the disc 10 are also illustrated in FIG. 2.

Figure 3:
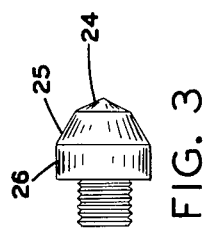
FIG. 3 is a modification of the reflector having a step cone portion on the reflecting surface.

FIG. 3 illustrates a conical reflector for use in an assembly as illustrated in FIG. 1. The conical reflector has a double cone surface. The conical surface 25 receives a view which is less oblique than the view received on surface 24. The annular surface 26 provides no reflection for the field of vision.

The purpose of the stepped cone integral reflector is to provide a means for the operator of the borescope to get two fields of view. The surface 24 reflects a field of view from substantially a different angle and distance than surface 25. The two surfaces provide a means for observing a point on an inner surface of the cavity from a different angle which aids in detecting the depth of the depression by lengthening of the shadows.

Figure 4:
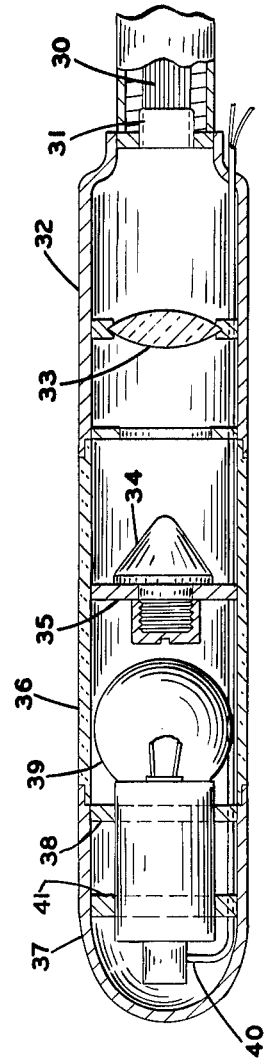
FIG. 4 is a modification including a housing means about the outer periphery of a source of illumination and the reflector.
Figure 5:
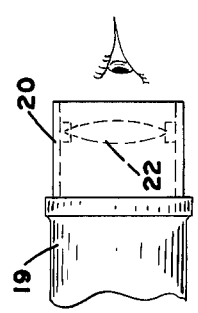
FIG. 5 is a fragmentary view of the viewing portion of the borescope which is broken away in FIG. 1.

FIG. 4 is a modification of FIG. 1 wherein a housing encloses the source of illumination and the reflector as well as the optical system. An external source of energization is employed to energize the source of illumination.

A bundle of flexible fibers 30 extend into the ring 31 which maintain the permanent arrangement of the plurality fibers relative to each other. The housing 32 encloses the lens 33. The lens 33 is coaxially mounted with the reflector 34 which is supported on the opaque disc 35. The disc 35 is mounted within the transparent housing 36 which extends axially forward and is fastened to the cap 37 which receives the disc 41. The cap 37 supports the plate 38 which provides a mounting means for the lamp 39. The lamp 39 is energized through the wires 40 which run through the housing to a source of electrical energy. The basic difference in FIG. 4 from FIG. 1 is in the fact that the source of illumination and the conical reflector are enclosed within the housing. This instrument provides a smooth external surface of the borescope and which provides a protecting means for the instrument. The operation of the instrument is substantially similar to that as illustrated in FIG. 1.

The device illustrated operates in the following manner. The source of illumination 3 is lighted to provide illumination of the internal surface of the cavity in which the instrument is inserted. The source of illumination 3 casts an oblique lighting rearwardly along the borescope. The oblique lighting of the lamp casts a shadow in a depression which may be present on the surface within the cavity. An image of the internal cavity surface is received on the polished mirror surface of the reflector 11. The reflector 11 receives an image for a full 360° about the outer periphery of the instrument. The conical surface also receives an image for a predetermined longitudinal distance along the inner periphery of the surface. This image is then reflected axially through the window 8 to the lens 6. The lens 6 focuses an image on the surface 16 of the plurality of fiber surfaces on fiber 17. The plurality of fibers 17 are oriented to transmit an image to the surface 50 on the rearward end of the bundle of fibers 17. This image is then focused to a point of observation external of the instrument.

The instrument as illustrated employs a reflector 11 having a conical shape which transmits an image from any radial distance to the lens 6. The device is operable in an air medium or a liquid and does not require any focusing means between the object and the mirror. FIG. 3 provides the added advantage of observation of the object from more than one angle. The surfaces of the cone may be inclined at any desired relation to each other. FIG. 4 illustrates a means for enclosing the instrument to provide a smooth peripheral surface for the device. The device has the advantage of sealing fluids from the illuminating source, and the reflector, as well as the optical system.

The above described borescope is illustrative and not restictive in setting forth the invention covered herein. Other modifications may illustrate and describe this invention without departing from the spirit of the invention restrictive in setting forth the invention covered herein. All equivalent disclosures falling within the principles of the invention are considered to be a part thereof.

I claim:

A borescope comprising, a source of light for oblique and radial lighting, means supporting said source of light, a reflector having at least two conical surfaces of different apex angles said surfaces facing in the same direction and mounted on said supporting means for receiving light rays from different fields of view, an image transmitting means, a lens means intermediate said reflector and said image transmitting means for receiving said light rays from said reflector and projecting images of said fields of view on said image transmitting means for transmitting images for visual observation external of said borescope.

References Cited by the Examiner

UNITED STATES PATENTS

| | | | |
|---|---|---|---|
| 2,737,864 | 3/1956 | Gutterman et al. | |
| 2,959,089 | 11/1960 | Hett | 88—14 |
| 2,987,960 | 6/1961 | Sheldon | 88—1 X |
| 3,100,482 | 8/1963 | Hett | 88—14 |

JEWELL H. PEDERSEN, *Primary Examiner.*

EMIL G. ANDERSON, *Examiner.*